United States Patent
Qing et al.

(10) Patent No.: US 7,319,691 B2
(45) Date of Patent: Jan. 15, 2008

(54) METHOD FOR PROVIDING GUARANTEED QUALITY OF SERVICE IN IP NETWORK AND SYSTEM THEREOF

(75) Inventors: Wu Qing, Shenzhen (CN); Jiandong Ge, Shenzhen (CN); Guoping Li, Shenzhen (CN); Jianzhong Huang, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 826 days.

(21) Appl. No.: 10/774,100

(22) Filed: Feb. 6, 2004

(65) Prior Publication Data

US 2004/0215817 A1  Oct. 28, 2004

(30) Foreign Application Priority Data

Feb. 20, 2003 (CN) .................... 03 1 04068

(51) Int. Cl.
*H04L 12/28* (2006.01)
*G06F 15/173* (2006.01)

(52) U.S. Cl. .................. 370/351; 370/392; 709/226
(58) Field of Classification Search ........... 370/328, 370/351, 389, 392, 395.2, 395.21, 400, 401; 709/226, 239–242
See application file for complete search history.

(56) References Cited

U.S. PATENT DOCUMENTS

| | | | |
|---|---|---|---|
| 6,266,694 B1 * | 7/2001 | Duguay et al. | 709/223 |
| 6,594,268 B1 * | 7/2003 | Aukia et al. | 370/400 |
| 6,760,306 B1 * | 7/2004 | Pan et al. | 370/230 |
| 6,967,954 B2 * | 11/2005 | Sugiyama | 370/395.52 |
| 7,082,102 B1 * | 7/2006 | Wright | 370/229 |
| 7,092,380 B1 * | 8/2006 | Chen et al. | 370/352 |
| 7,120,151 B1 * | 10/2006 | Ginjpalli et al. | 370/395.1 |
| 7,161,946 B1 * | 1/2007 | Jha | 370/401 |
| 7,215,640 B2 * | 5/2007 | Matsubara | 370/235 |
| 2001/0036164 A1 * | 11/2001 | Kakemizu et al. | 370/331 |
| 2002/0071389 A1 * | 6/2002 | Seo | 370/232 |
| 2004/0165597 A1 * | 8/2004 | Bicknell et al. | 370/395.31 |
| 2005/0018605 A1 * | 1/2005 | Foote et al. | 370/230 |

* cited by examiner

*Primary Examiner*—Wing Chan
*Assistant Examiner*—Hong Sol Cho

(57) ABSTRACT

The invention discloses a method for providing guaranteed Quality of Services (QoS) in an IP network. In the invention, separated with the function of route selection for IP packets in IP bearer network, the same function for services with guaranteed QoS requirements is accomplished by bearer network resource managers in bearer control layer. After completing the route selection according to network resource occupation condition, the bearer network resource managers control the edge routers so that the traffic streams can be forwarded according to the path designated by the resource manager in the bearer network with multi-level label stack technology. The invention also discloses a system for providing guaranteed QoS in an IP network. The method and system according to the invention have good expansibility and little impact to the prior network.

16 Claims, 7 Drawing Sheets

METHOD FOR PROVIDING GUARANTEED QUALITY OF SERVICE IN IP NETWORK AND SYSTEM THEREOF

CROSS-REFERENCE TO RELATED APPLICATIONS

This application claims the benefit of Chinese Patent Application No. 03104068.3 filed on Feb. 20, 2003. The disclosure of the above application is incorporated herein by reference.

FIELD OF THE INVENTION

The present invention relates to IP network technology, more particularly to a method for providing guaranteed Quality of Service (QoS) in an IP network and a system thereof.

BACKGROUND OF THE INVENTION

At present, IP network of telecommunication service provider can only provide data services as possible. Along with the number of broadband network subscribers increases, the service requirements on IP network are getting more and more. The real-time services, such as voice and videoconference etc., have strict requirements for QoS.

As shown in FIG. 1, a whole IP network of a telecommunication service provider comprises access/edge layers and a core layer. Subscribers of the IP network can access to the edge router E through various access means, such as XDSL, HFC, Ethernet, lease line or WLL etc. The edge router E is responsible for management of the subscribers and is connected to the core router RH that is responsible for forwarding and routing IP packets. An IP network can be huge, for example, a national wide network of a telecommunication service provider may comprise thousands upon thousands of core routers and edge routers. In view of the convenience of management and stability of network route, the IP network can be divided into a plurality of independent route management areas as shown with dot lines in FIG. 1. The whole network consists of a plurality of network areas and the connections between them.

A network can be divided into areas based on administration region, such as city, province and nation; or based on other ways. Usually, an IP network of a telecommunication service provider is divided based on administration region and each area may be an IP Autonomous System (AS).

Due to design ideas, in general there is no means for guaranteed QoS in prior IP network. In order to adapt the development of network applications, various methods for IP QoS have been proposed, including Integrated Service (Int-Serv) model and Differentiated Service (Diff-Serv) model. Among them, the Diff-Serv model can be used to provide QoS support together with Multiprotocol Label Switching (MPLS) technology. At present, a combination of the Int-Serv model and Diff-Serv model is a common method in which the Int-Serv model is used in the access network and the boundary and the Diff-Serv model is used in the backbone network. The MPLS technology can be used when the Diff-Serv model is used in the backbone network.

When the Diff-Serv model is used, if only priority is set in Type of Service (ToS) in order to guarantee QoS, the effect is unpredictable although it has the advantage of high line utilization factor. Therefore, further improvement for Diff-Serv has been implementing. Some organizations and vendors introduce an independent bearer control layer on the backbone Diff-Serv and establish a set of special Diff-Serv QoS signaling mechanism. In order to promote application of the Diff-Serv, IETF, some vendors and institutes together push the Internet 2 on the Qbone experiment network, which takes Bandwidth Broker (BB) to manage network resources and topology. Also, some other vendors propose methods of managing resources and topology and coordinating QoS capability of each Diff-Serv area using similar QoS server/resource manager technology. In all these methods, a bearer control layer for managing network resources and topology is specially established for Diff-Serv basic network. As shown in FIG. 2, this Diff-Serv mode with professional network resource management is called a DiffServ model with an independent bearer control layer.

In the Diff-Serv model with an independent bearer control layer, an edge router of the network makes classification and mark of DS field for each group, and uses the DS field of an IP packet or EXP information of a MPLS packet to carry priority information of the IP group. In the core node of the network, the router selects corresponding forwarding processing for the packet based on the priority information. Servers in the bearer control layer, including BB or QoS server/resource manager, configure management rules and network topology and allocate resources for service bandwidth requests of subscribers. The specified bandwidth can be shared through the coordination with subscribers via Service Level Agreement (SLA). The bearer network control servers of each management area transfer service bandwidth requests and results, path information allocated for the service requests by the bearer network resource manager etc. between each other through signaling. At present, the problems such as it is difficult to implement, plan, operate and maintain are existed in the prior Diff-Serv model with independent bearer control layer, such as a bandwidth broker model of the Qbone.

In the first prior technical scheme, as shown in FIG. 3 illustrating an Internet2 BB model, Internet2 defines corresponding BBs for each Diff-Serv management area, and the BB is responsible for handling bandwidth application requests from subscriber computers, service servers S or network servicing staff. The BB determines whether or not to allow the bandwidth application according to the preserved resource condition of the current network, configuration policies and the SLA of the service signed with the subscriber.

As shown in FIG. 4, a bandwidth manager records a large amount of static and dynamic information including various kinds of SLA configuration information, topology information of the physical network, configuration information and policy information of routers, user authentication information, information about the current preserved resources and information about occupation condition of network etc. At the same time, the bandwidth manager also records route information in order to determine a traffic stream route and the position of a downstream bandwidth manager in crossing areas.

In the bandwidth manager model of Internet2, since the bandwidth manager directly manages the resource information and configuration information of all routers in the area, there is a problem that topology and management is very complicated. At the same time, since the bandwidth manager needs to record the dynamic route information of the area, there is a problem that the route table is updated frequently which will result in the unstableness of the network preservation. In addition, it is difficult for the service route determined by the dynamic route information in the area accord with the real forwarding route of the traffic stream.

Since there are too many problems in the bandwidth manager model, the model has not been put into business application till now.

In the second prior technical scheme which is a Rich QoS solution proposed by NEC of Japan, as shown in FIG. 5, the QoS Server (QS) is regarded as a key element. The policy server (CS), directory server (DS) and network management monitoring server are also included in the solution. The policy server implements parameter setting and configuration for related routers according to the policy configuration information such as the information about QoS server and management interface. The directory server is a concentrated database for storing network device configuration information, user information and QoS information. The network management monitoring server is responsible for collecting information such as block state of routers and links etc., which can be reference to the QoS server for selecting route for service application.

The QoS server is responsible for allocating a bearer route that satisfies the QoS requirement based on the network topology and resource condition of the bearer network. It is necessary to preset the topology and bandwidth condition in QoS server and pre-configure the rules for route selection. When the service server sends a bandwidth request to the QoS server, the QoS server records the resource request of this call, and allocates a bearer route that satisfies the requirements according to QoS requirements, the current topology and resource condition of the bearer network for this service request, and returns the allocation result to the service server.

The QoS server sends a corresponding LSP policy modification command to the policy server according to the bandwidth occupation condition of the service. Then, the policy server configures a correspondent edge router according to the commands from the QoS server.

The edge router will use MPLS LSP display route technology to recreate or adjust LSP according to the path determined by the QoS server.

In the Rich QoS scheme proposed by NEC, it is also a complicated bearer network that the QoS server manages, and there are a large amount of routers. The QoS server and policy server use MPLS LSP display route technology to inform edge routers. The mode of establishing end-to-end LSP has the disadvantage of poor expansibility and limited network scale. So, the scheme is unable to satisfy the end-to-end service requirements in a national wide public network.

Since the bandwidth manager directly manages the resource information and configuration information of all routers in the area, there is a problem that topology and management is very complicated. In the solutions proposed by other vendors such as NEC, the QoS server still manages a complicated bearer network. The mode of establishing end-to-end LSP with display route technology used in bearer network has the disadvantage of poor expansibility and limited network scale and it cannot satisfy the end-to-end service requirements in a national wide public network. Consequentially, how to provide guaranteed QoS from the original edge router to the destination edge router for the service request of subscribers, such as VoIP or video-telephone etc., in a large IP backbone network of the telecommunication service provider is a problem needs to be solved urgently.

SUMMARY OF THE INVENTION

An object of the invention is to provide a method for providing guaranteed QoS in an IP network so as to satisfy the QoS requirements of the end-to-end services in public network.

Another object of the invention is to provide a system for providing guaranteed QoS in an IP network.

In order to realize the objects of the invention, first, with LSP of MPLS technology, correspondent service bearer logic network is separated in the IP physical network for specific services so as to part the specific services and the conventional Internet services. Secondly, the concepts of bearer control layer and bearer network resource manager are introduced; the bearer control layer consists of the bearer network resource managers and is responsible for resource computation and route selection for subscriber services. After determining service path and QoS parameters, the bearer network resource manager informs an IP network edge device to designate the path property and QoS property for the traffic stream. Finally, with multi-level label stack of MPLS technology, the IP network devices forward the traffic stream IP packets in the IP network according to the path designated by the bearer network resource managers.

A method according to the invention comprises the following steps:
 a. after receiving a service request with guaranteed QoS requirement from a subscriber, a relevant service entity in the network obtaining the addresses of source subscriber and destination subscriber and QoS parameters for the service through analyzing the service request, and sending a route selection and resource application request to bearer control layer of the network;
 b. a bearer network resource manager in the bearer control layer allocating route and resources for the service in the service bearer logic network according to said addresses of the source subscriber and the destination subscriber and service type; and
 c. forwarding the traffic streams in the service bearer logic network according to the route and resources determined by the bearer control layer.

In the above-mentioned method, the service bearer logic network includes edge nodes and tandem switching nodes between which Label Switched Path (LSP) connections are established with Multi-Protocol Label Switching (MPLS) technology. The service bearer logic network is pre-planned and pre-configured from basic network according to the service type.

In the above-mentioned method, route allocated for the service is represented with a multi-level label stack, in step c, nodes in the service bearer logic network forward the traffic stream according to labels configured in the multi-level label stack; and the levels of the multi-level label stack is decreased by one level whenever a MPLS packet for the service passes a switching node.

During forwarding traffic stream data packets, the just passed LSP ends whenever a traffic stream data packet passes a switching node, the label representing said LSP in the multi-level label stack is popped at this switching node or the second last hop router in the LSP, then said switching node forwards said packet according to the current top label representing the next LSP.

The step b can further comprises the step of informing the service control layer to reject the service request from the subscriber when a bearer network resource manager finds the route selection is failed due to no enough resources in the logic topology of the area.

A system according to the invention comprises: a basic network layer including edge routers and core routers, for bearing various IP service packets; a service bearer logic layer planed and configured from the basic network, including edge nodes, tandem switching nodes and connections among them, for bearing traffic streams with guaranteed QoS requirements; a bearer control layer including resource managers, for managing the bearer network resources of said service bearer logic layer and basic network layer; and a service control layer including service entities, for processing service requests.

As compared with the prior models, in the invention, a service bearer logic network is planned and configured in IP physical bearer network with MPLS technology in advance so that the services with QoS requirements and the conventional Internet services can be managed separately, which provides the base for realizing resource management and route selection in bearer control layer. At the same time, the function of route selection and resource allocation is independent with the routing protocol and the resource allocation mechanism of the prior IP basic network and a special bearer control layer is used to process the route selection and resource management for subscribers. In addition, the request can be rejected if there is no enough resource. With the multi-level label stack technology of MPLS used in the bearer network, traffic streams of subscribers can be forwarded according to the path designated by the bearer control layer in IP physical network. So the QoS requirements of end-to-end services in public network can be satisfied well by means of the invention.

In addition, the new introduced bearer network control layer does not result in reconstruction of the network routing protocol. And it is not necessary to modify the core routers for forwarding traffic streams according to the route designated by bearer network with multi-level label stack of MPLS technology. So the invention has little impact to the prior network.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 12:
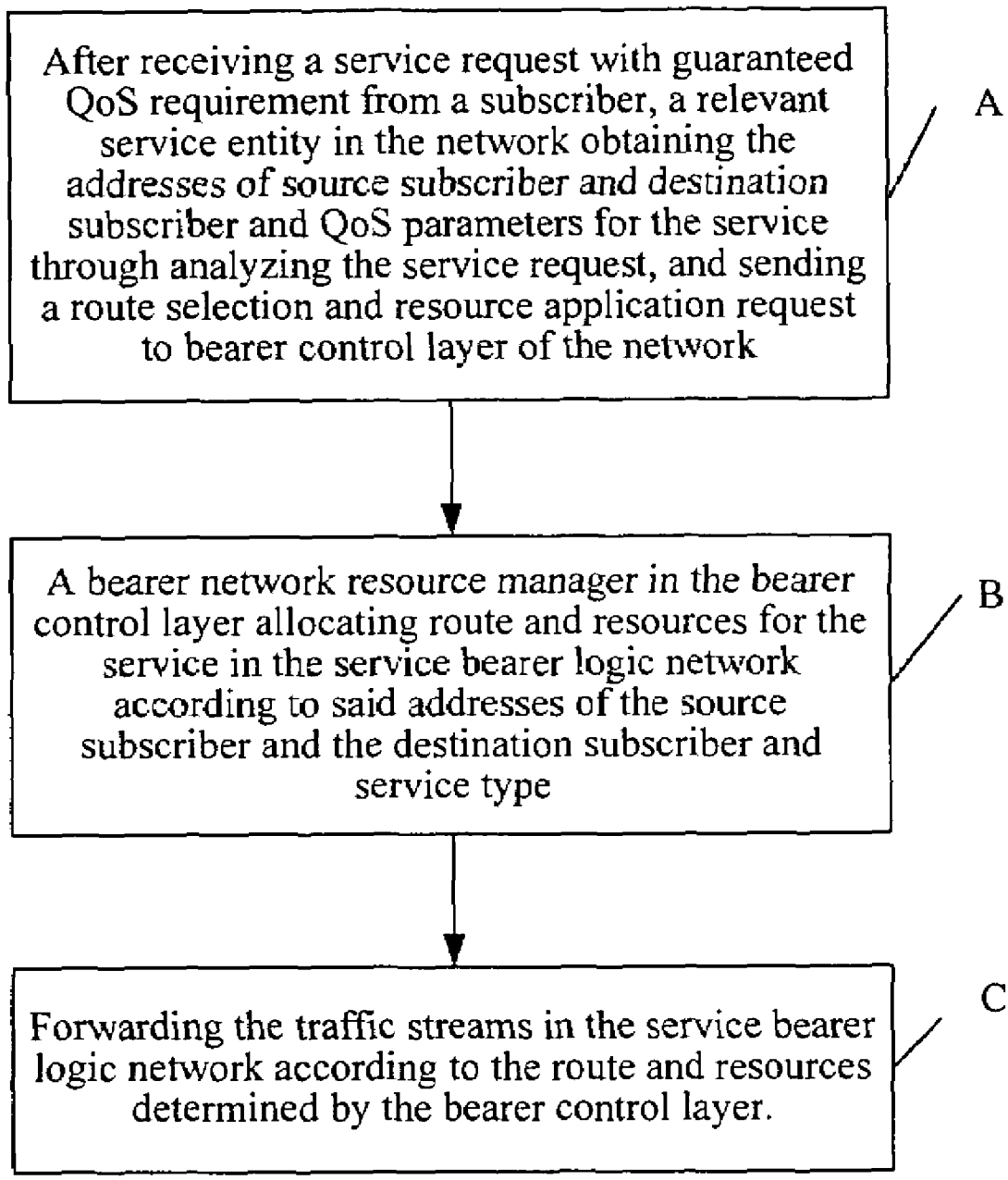
FIG. 12 is a flowchart of the invention.

Referring to FIG. 12, a method according to the invention comprises the following steps.

In step A, a subscriber initiates a service request with guaranteed QoS requirement, a relevant service entity of the network obtains the addresses of the source subscriber and destination subscriber and related QoS parameters for this service request through analyzing the service request, and then sends a route selection and resource application request to the bearer control layer of the network.

In step B, the bearer network resource manager of the bearer control layer allocates route and resource for this service in the bearer logic network according to the addresses of the source subscriber and destination subscriber and the service type.

The route allocation uses multi-level label stack, and the bearer control layer informs the edge nodes of the bearer logic network of the multi-level label stack.

When finding the failure of route selection due to no enough resource in the logical topology of the area, the bearer network resource manager asks the service control layer to reject the service request.

In step C, the traffic stream is forwarded in the service bearer logic network according to the route allocated by the bearer logic layer.

In the service bearer logic network, the edge node of the traffic stream source end encapsulates a multi-level label stack of the route on each sent traffic stream data packet. The nodes in the service bearer logic network forward the traffic stream according the multi-level label stack. When the traffic stream data packet passes a switching node, one layer of the multi-level label stack is taken off.

The invention will be described in more detail hereinafter with reference to the accompanying drawings and an example of IP backbone network.

Figure 1:
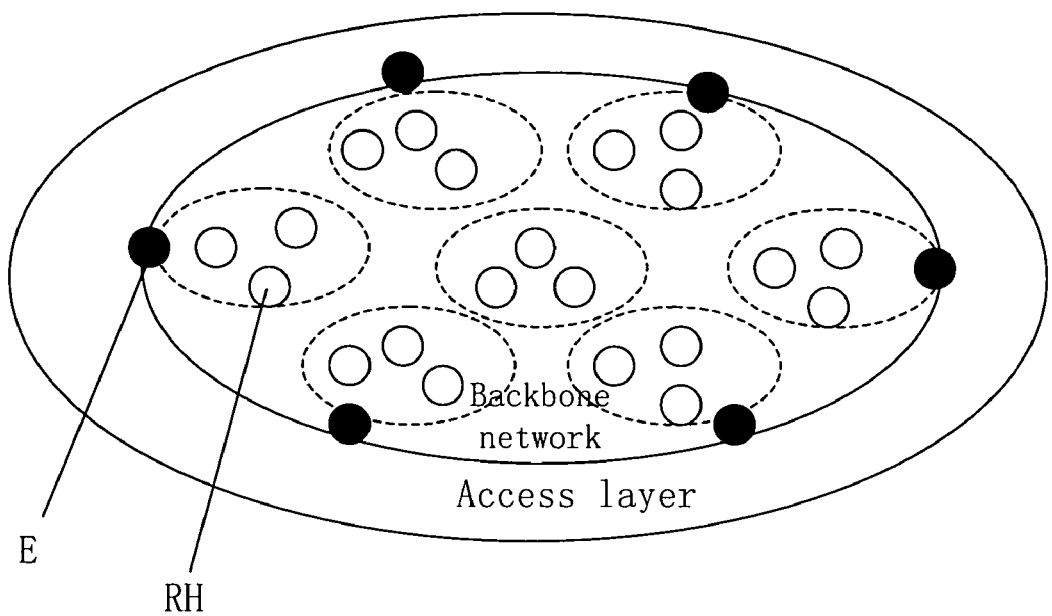
FIG. 1 is a schematic diagram illustrating network architecture of an IP network.
Figure 2:
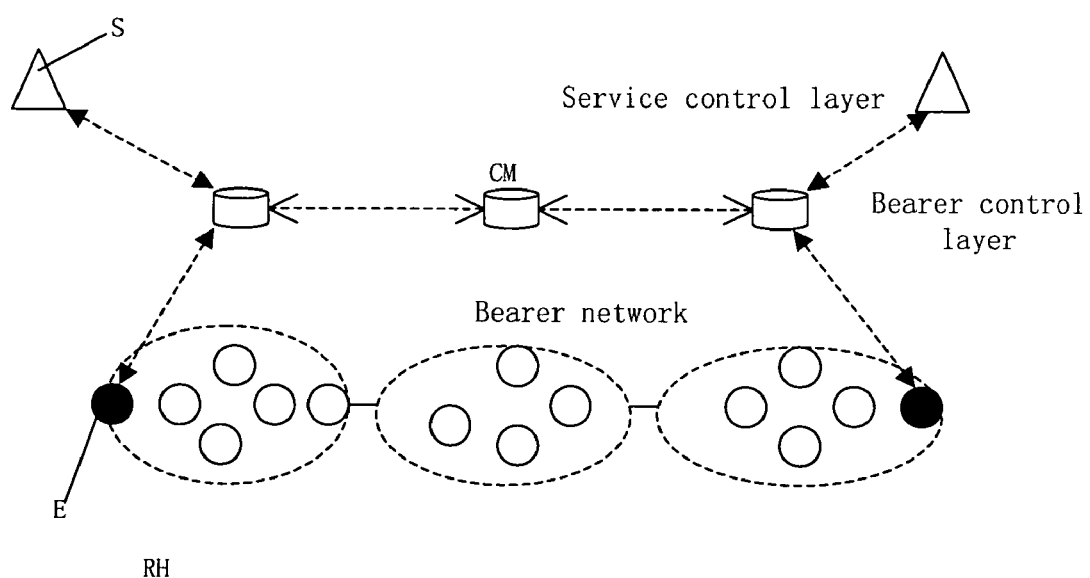
FIG. 2 is a schematic diagram illustrating the network model of independent bearer control layer.
Figure 3:
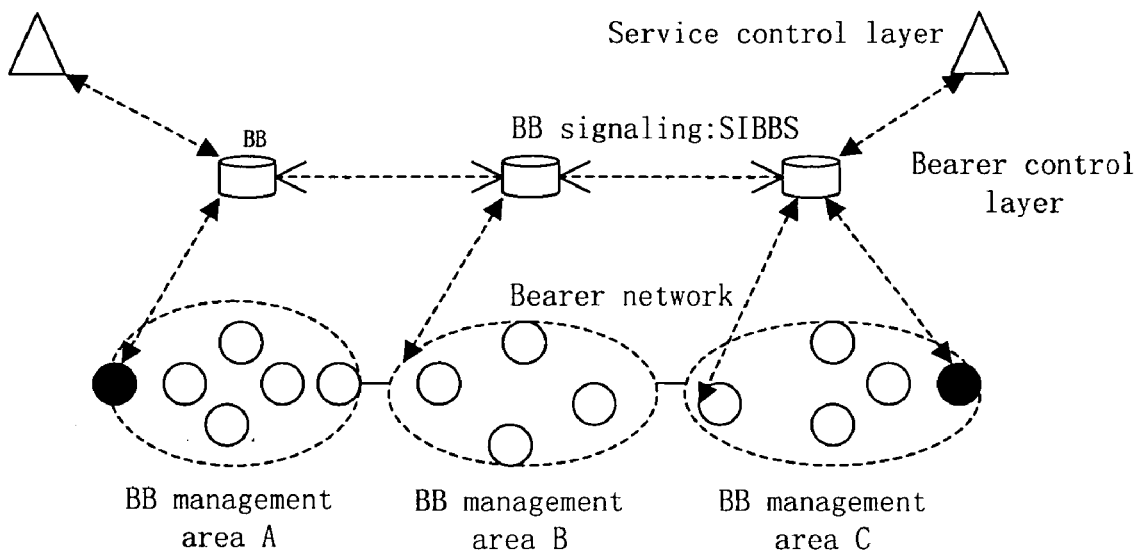
FIG. 3 is a schematic diagram illustrating the model of bandwidth brokers of Internet2.
Figure 4:
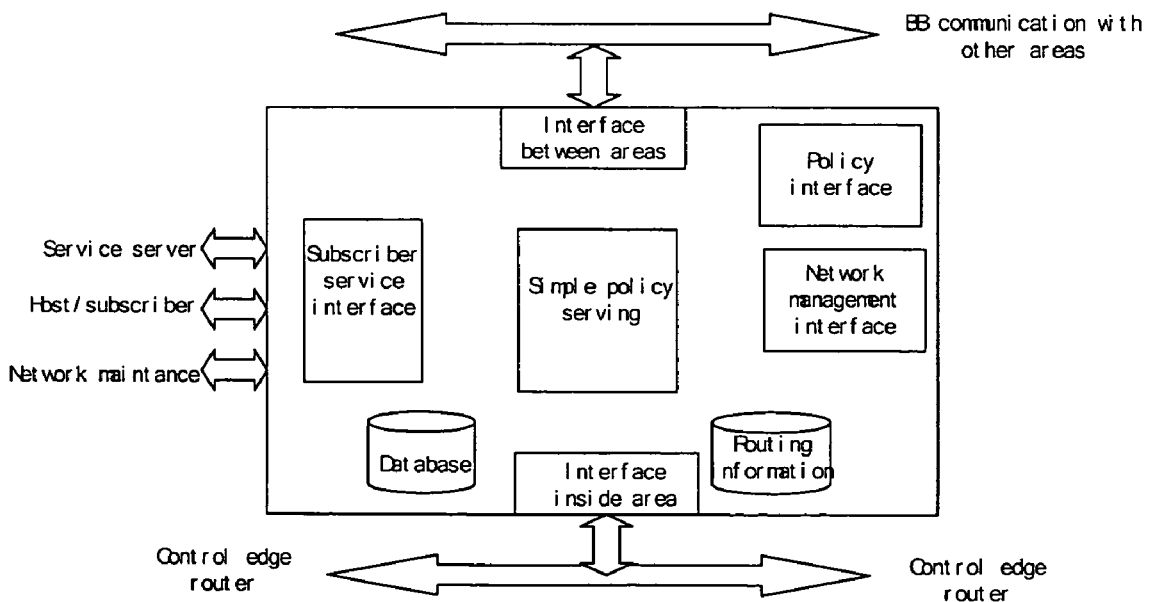
FIG. 4 shows the internal function principle of a bandwidth broker.
Figure 5:
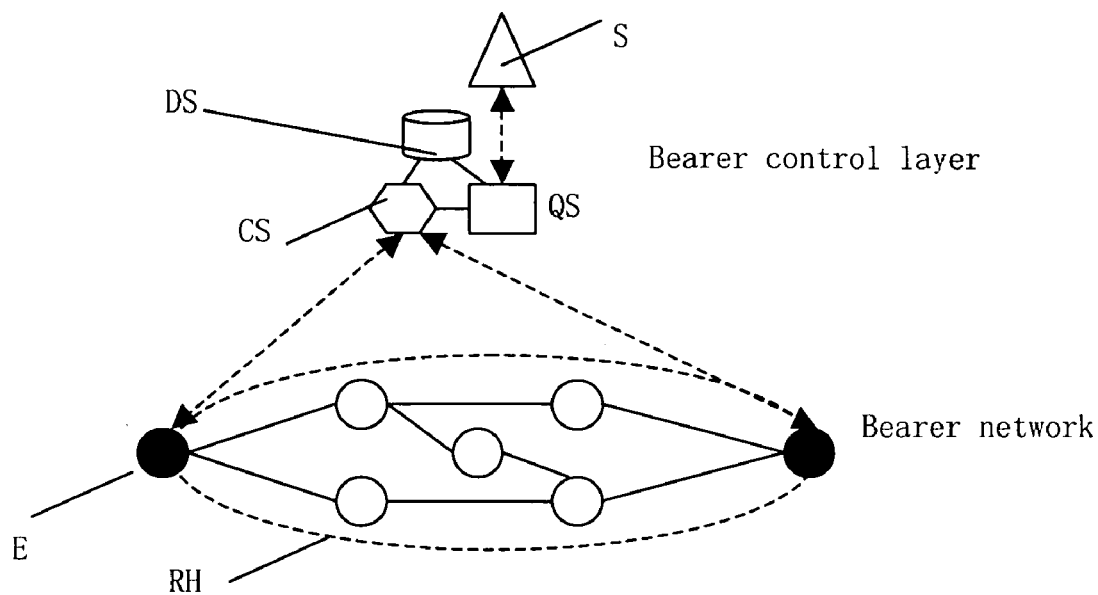
FIG. 5 shows the Rich QoS solution proposed by NEC of Japan.
Figure 6:
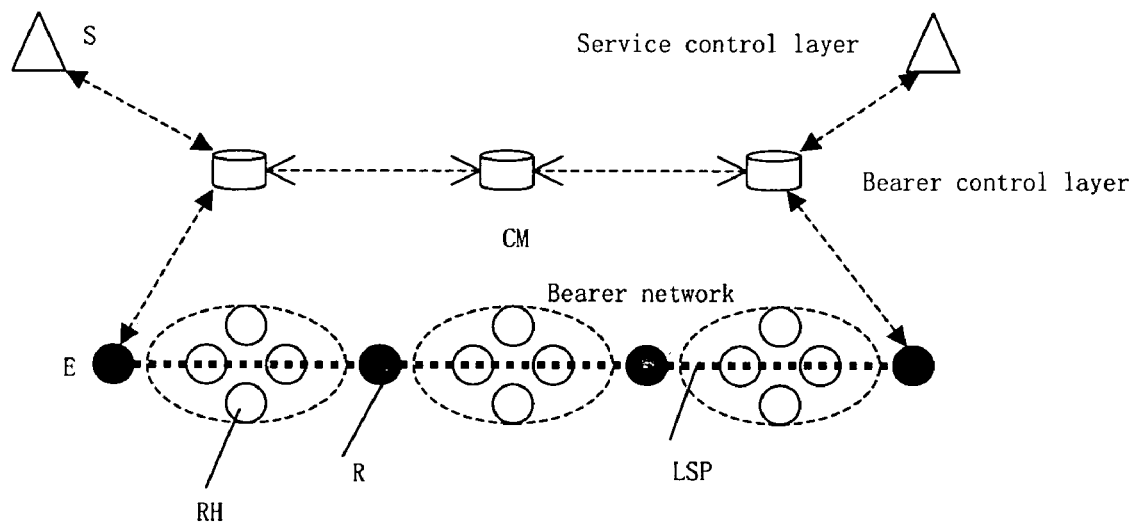
FIG. 6 is a schematic diagram illustrating a whole model of the invention.

As shown in FIG. 6 in which the global structure of the network according to the invention is illustrated, a network comprises a bearer network which includes a basic network layer and a service bearer logic network, a bearer control layer and a service control layer in term of service function model.

Being a physical network entity consisting of edge routers E and core routers RH, the basic network layer of the bearer network is used for bearing various IP packets. The service bearer logic network of the bearer network is a logic network that is pre-planned for a certain type of services based on the basic network layer using MPLS technology.

The bearer control layer is responsible for managing bearer network resources of the bearer logic network and basic network layer. It selects bearer path satisfying QoS requirements on service bearer logic network for the service request of the subscriber.

The service control layer consists of some servers for service request processing, such as the SoftSwitch for processing call signaling of VoIP/Video Telephone, the Web server of VoD service for processing VoD request of subscribers.

In view of convenience of management and stableness of network, the whole IP basic network is divided into different network resource management areas as shown in the areas with dot-lines. The dividing of network resource management areas can correspond to that of routing areas. Each management area is managed by the bearer network resource manager (CM) which is responsible for network resource computation and route selection for a subscriber service. The CMs of different areas constitutes the bearer route selection network by logic. The bearer network route satisfying QoS requirements can be selected for service request that spans several management areas through the signaling between each other.

The basic network layer is a final bearer device layer for various IP services. Both the Internet services without guaranteed QoS and IP services with guaranteed QoS are borne by the basic network layer. In order to ensure the traffic streams with QoS be reliably borne by the IP basic network, the traffic streams of Internet services and those of guaranteed QoS must be parted and be forwarded along different paths.

Figure 7:
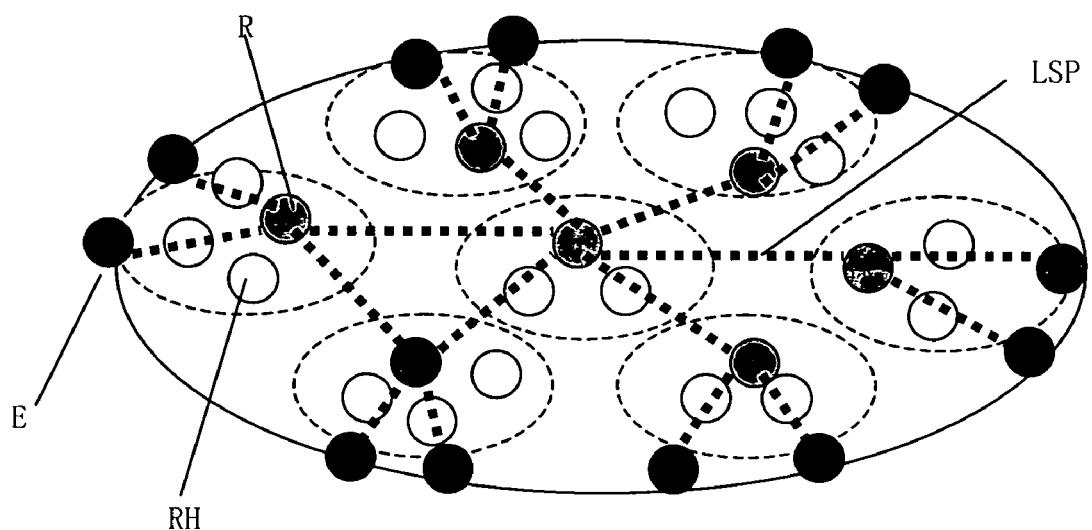
FIG. 7 shows the service bearer logic network established with LSP of MPLS technology.

Referring to the network structure of PSTN which consists of end offices, tandem offices, provincial toll offices, international toll offices and the trunks among offices, a service bearer logic network can be planed for one kind of IP services on the basis of IP basic network. The service bearer logic layer consists of edge nodes, tandem switching nodes and logic connections among the nodes. The edge router E is the edge node of the service bearer network. Some core routers RH in each IP network resource management area can be selected as the tandem switching nodes R. The nodes are connected through LSP which is pre-established with the MPLS technology, for example, the LSP can be statically configured with signaling such as RSVP-TE or CR-LSP as well as MPLS traffic engineering technology, and the bandwidth and other QoS characteristics for the LSP design are preserved. The edge nodes, tandem switching nodes and LSP connections form the logic bearer network of the traffic stream as shown in FIG. 7.

The MPLS logic bearer network also can use layering LSP technology, in other words, the LSP connections among edge nodes/tandem switching nodes can pass some low layer LSPs besides some physical links of routers. But these low layer LSPs are processed as tunnel interfaces on the bearer network, and they do not appear in the service logic bearer network. The bearer control layer only needs to process the LSP connections among edge nodes/tandem switching nodes, and does not need to process lower layer LSPs.

After a service request with guaranteed QoS from a subscriber has been accepted, the traffic stream enters an edge node (an edge router); and the edge node makes the traffic stream enter the logic bearer network. The traffic stream starts from the initiating edge node, after passing some tandem switching nodes, reaches an ending edge node. The traffic stream can be uniquely determined through the LSP in the logic bearer network, so the traffic stream is forwarded along the path that is defined by the bearer control layer. In this way, controllable traffic stream route forwarding can be realized, and the condition that the traffic streams are forwarded jointly with the Internet services can be prevented, so that the QoS of traffic stream can be guaranteed and the servicing level in IP network can reach to that in PSTN.

There are multiple methods to plan the service bearer logic network on basic network layer. The telecommunication service provider can design metropolitan domain networks, provincial backbone networks and national backbone networks or even an international backbone network respectively with reference to the plan arrangement of a PSTN public telephone network.

Independent logic bearer networks can be respectively planed and configured for different services, such as VoIP, video telephone and VoD etc. Of course, the topology structure of the logic bearer network for each service can be the same or different, which depends on the practical condition in the specific implementing process, the selection of tandem switching nodes, the conversion model and load anticipation of each service.

The network topology structure of the logic bearer network preserved and set by the basic network layer for each service with guaranteed QoS will be recorded in the CM of the bearer control layer, and the state of each LSP among nodes will be reported to the CM also. The CM in each area will manage the logic bearer network of multiple services in the administration area.

The bearer control layer makes resource computation and route selection for a service request in the bearer logic network. The bearer control layer consists of CMs of all areas, and each CM manages the resources and route selection of the service bearer logic network in one area. The resource control and route selection for the area spanned service application can be accomplished by multiple CMs through the signaling among them.

For each conversation, it is necessary for the subscriber to send a service request such as VoIP call or video telephone call through service signaling. After receiving the application, the corresponding service processing server judges the subscriber right for this service and the addresses of the calling and called subscribers, and determines the QoS parameters such as bandwidth needed for this conversation etc.; and then applies to the bearer control layer for corresponding resources and service bearer path. The interface can be an internal interface or an open interface, which depends on the specific implementing method. It will be an internal interface under the condition that the service control layer server is integrated with the CM. In other conditions, the signaling such as Session Initiation Protocol (SIP) can be used as the interface between the service control layer and the bearer control layer.

After receiving the request of route selection and resources application from the service control layer, the CM of bearer control layer will select route for this request in the service bearer logic network according to source address and the destination address. If it is found that there are no enough resources in the logic network topology of the area, the CM will inform the service control layer to reject the subscriber request. If the route selection is successful, the CM informs corresponding edge router to set appropriate QoS parameters and service path parameters corresponding to the IP traffic stream. After the conversation is finished by subscriber, the bearer control layer releases the resource occupied by the subscriber, and informs corresponding edge router to take off the IP traffic stream processing.

When the conversation spanning multiple resource management areas is processed, the CM of the bearer control layer not only performs route selection in this area, but also selects a CM of neighbor area and sends path request to it according to the destination subscriber address or number, which is similar to the function of the outing route in PSTN.

The request information between CMs includes not only the destination subscriber information, but also the path information about passing areas, i.e., the information about what LSPs have been passed. After receiving a request from an upstream CM, the current CM looks for route towards the destination domain. If the area itself is the destination area, the CM selects the path in the area based on the ingress LSP information and QoS requirement and informs the upstream CM of the selected path. If the area is not the destination area, the CM defines the downstream CM according to the destination subscriber information such as telephone number or IP address etc., and selects the path inside the area according to the ingress LSP information and QoS requirement, then sends a request message to the downstream CM. The request information includes the destination subscriber information, and the path information inside the area can be added to the service path information, i.e., the information about what LSPs have been passed.

If finding that there are no enough bearer network resources in the area, the CM will reject the service application and send failure information to the upstream CM. The CMs along the path will release corresponding resources and forward the failure information to the upstream CM. The starting end CM will inform the service control layer that the request is popped after receiving the failure information.

When a subscriber terminates a service, the service control layer will send a releasing resource command to corresponding CMs. The CMs along the path of this service will release the resources that allocated to the service before.

Figure 8:
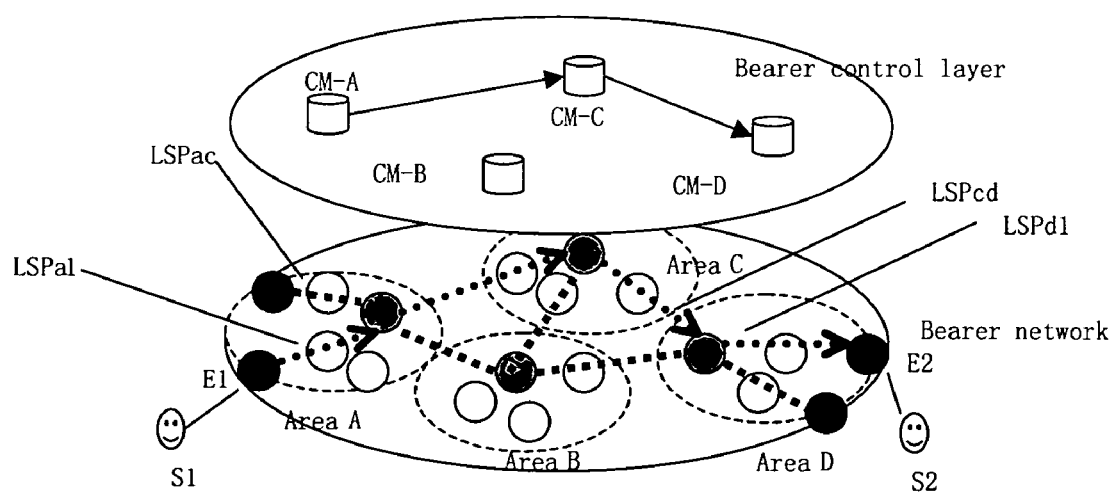
FIG. 8 is a schematic diagram illustrating the route selection procedure of bearer control layer.

As shown in FIG. 8, a possible implementation process in the bearer control layer for a subscriber service application will be described taking that subscriber S1 requests to communicate with subscriber S2 as example. Here, subscriber S1 is connected to the edge router E1 that belongs to area A, the subscriber S2 is connected to the edge router E2 that belongs to area D, and the CM-A, CM-B, CM-C and CM-D manage the areas A, B, C and D, respectively.

(1) After obtaining the addresses of the calling and called subscribers through analyzing subscriber call request, the service control layer server sends a request to the CM-A of the area of subscriber S1 to apply for creating a traffic stream path between subscribers S1 and S2.

(2) After receiving the request, the CM-A selects the CM-C as the downstream CM according to the address or telephone number of S2 and the paths "LSPa1/LSPac" as the path from node E1 to area C according to current resource condition of area A, then updates the resource condition of the logic bearer network recorded in the CM-A.

(3) The CM-A sends request information to the downstream CM-C. The request information includes calling information such as the addresses or numbers of subscribers S1 and S2, required QoS parameters, and may also include path information of "LSPa1/LSPac" in area A.

(4) After receiving the resource request information from CM-A, the CM-C obtains its ingress path LSPac, and finds that the downstream CM is CM-D through searching bearer route information according to the information about destination subscriber S2. Then the CM-C selects LSPcd as the egress path of area C according to ingress path LSPac, the downstream area D, QoS requirements for the service application and the resource condition of area C.

(5) Having added the path information in area C to received request information, the CM-C sends request information to the downstream CM-D once again. The request information includes calling information about subscribers S1 and S2, required QoS parameters, and path information of "LSPa1/LSPac/LSPcd" that the call application passes.

(6) After receiving the request information from CM-C, the CM-D obtains ingress path of area D LSPcd, and finds the edge node E2 in area D through searching bearer route information according to the information about destination subscriber S2. Then CM-D selects the LSPd1 as the path to node E2 according to ingress path LSPcd, destination node E2, QoS parameters for the service application and the resource condition in area D.

(7) The CM-D sends information showing that the resources have been preserved successfully to upstream CMs. The information includes calling information about subscribers S1 and S2, and the whole path for the calling application "LSPa1/LSPac/LSPcd/LSPd1".

After the complete processing, the whole path of the traffic stream in the bearer network will be known by all the CMs along the path.

Besides the above-mentioned implementation process for area spanned services, there may be some other implementation processes. A subscriber service application can be a unidirectional traffic stream or a bi-directional traffic stream. When it is a bi-directional traffic stream, the paths in two directions can be allocated the same path, or allocated different paths respectively. No matter which implementation process is employed, the bearer control layer will decide the complete path in the service bearer logic network for each service application.

Figure 9:
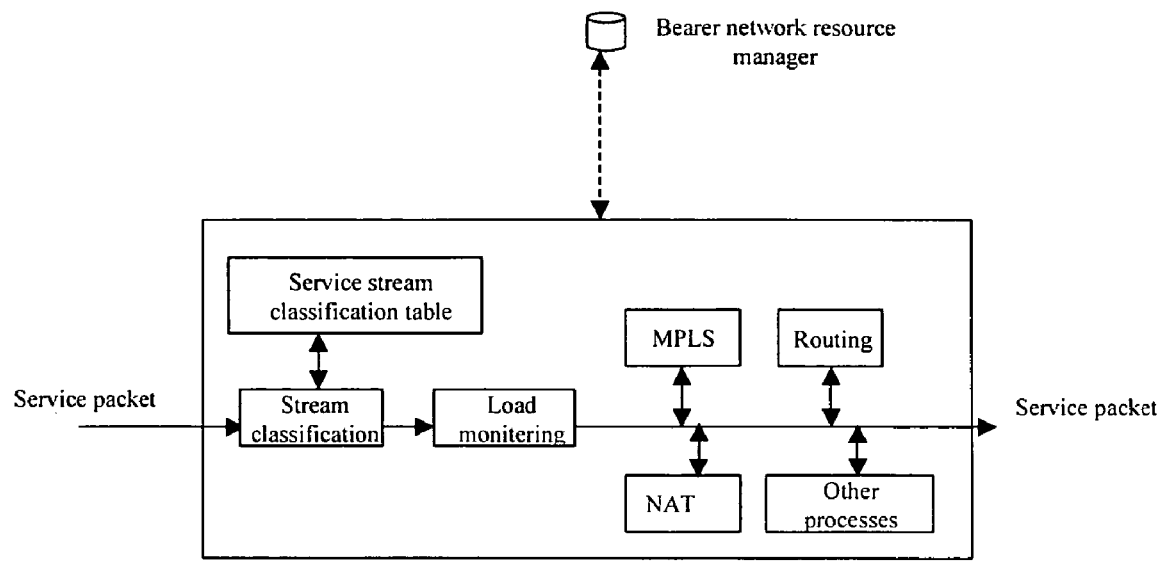
FIG. 9 is a block diagram illustrating the function of an edge router.

As shown in FIG. 9, after the bearer path has been determined, the CM will inform the edge router in the area where the subscriber is located to set the QoS parameters such as bandwidth and priority of the traffic stream etc., and to set the bearer path of the traffic stream to ensure that the traffic stream is processed according to the QoS parameters determined by service and ensure that the traffic stream is forwarded along the path determined by the CMs. When a subscriber service application is successful, under the control of CM, the edge router creates corresponding items of traffic stream classification table, records the QoS parameters such as bandwidth and priority required by the traffic stream, and the forwarding path parameters in the bearer network for the traffic stream. The edge router will process an IP packet that belongs to the traffic stream according to the determined QoS parameters and forwarding requirements. When a subscriber terminates the service, the edge router will delete corresponding items of traffic stream classification table under the control of CM.

Both the methods of display route and multi-level label stack of MPLS technology can be used to realize the forwarding traffic streams according to the determined bearer path in basic network. The method of multi-level label stack is used in this embodiment.

After selecting a bearer path for the subscriber service application, the bearer control layer informs the edge router of bearer network of the forwarding path for a certain traffic stream, and forwards the traffic stream according to the path determined by the bearer control layer with multi-level label stack method of MPLS technology. The edge router encapsulates IP packets of the traffic stream with the multi-level label stack according to the commands from the bearer control layer, and the tandem routers only forwards the pre-configured labels. Switching routers are routers at LSP starting and terminating points, and preferred have the processing capability for two-level label stack.

Figure 10:
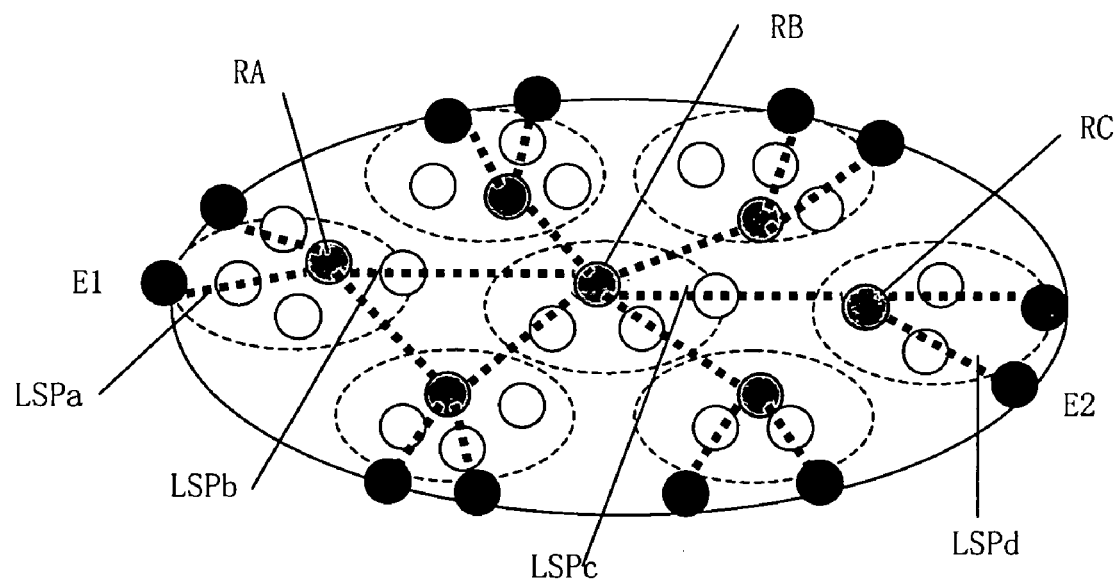
FIG. 10 is a schematic diagram of a service path.

As shown in FIG. 10 in which a forwarding procedure using the multi-level label stack is illustrated, there are some core routers between two edge routers E1and E2. A subscriber service is a traffic stream from the edge router E1 to E2. The bearer path allocated for the traffic stream by the bearer control layer is: edge router E1-LSPa → switching router RA-LSPb → switching router RB-LSPc → switching router RC-LSPd → edge router E2.

If the labels corresponding to each node in the path are global labels, for example, the global label for E1 of LSPa is La, the global label for RA of LSPb is Lb, the global label for RB of LSPc is Lc and the global label for RC of LSPd is Ld, the label stack for the path LSPa → LSPb → LSPc → LSPd is La/Lb/Lc/Ld, wherein La is at the top of the label stack.

Figure 11:
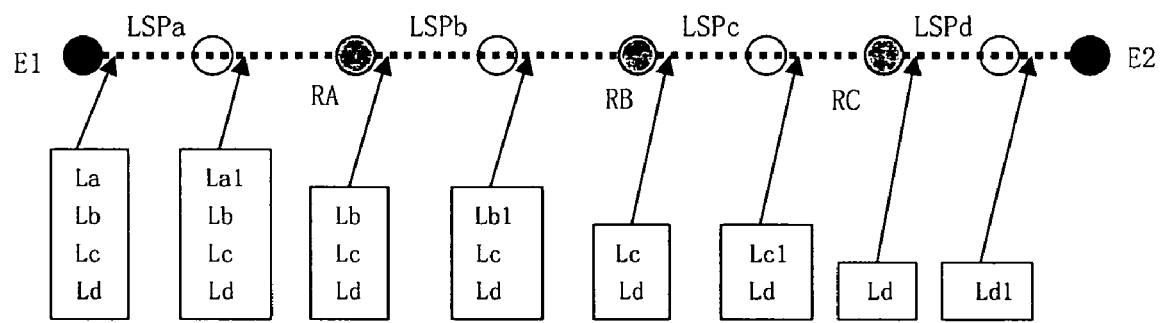
FIG. 11 is a schematic diagram illustrating the forwarding procedure with a multi-level label stack.

As shown in FIG. 11, if the function of popping at the second last hop is not configured in the routers along the path, the forwarding of MPLS in the bearer network for the traffic stream is as follows.

First, when a traffic stream packet reaches edge router E1, E1 encapsulates the packet with the label stack La/Lb/Lc/Ld according to the commands from the bearer control layer, wherein La is at the top of the label stack. E1 then sends the MPLS packet along LSPa. When the MPLS packet is forwarded through the LSPa, it passes some routers; but all these routers forward the MPLS packet only according to the top label of the label stack and perhaps replace the top label.

When the MPLS packet arrives at switching router RA along LSPa, since the LSPa ended at RA, the RA pops the top label and forwards the MPLS packet according to the second label Lb. Therefore, the MPLS packet will be forwarded along LSPb, with the label stack being decreased by one level.

Similarly, the MPLS packet is then forwarded along LSPb. When the MPLS packet passes some routers, these routers forward the MPLS packet only according to the top label of the label stack and perhaps replace the top label. After the router RB has received the MPLS packet, since LSPb ended at RB, it pops the top label of the label stack and forwards the MPLS packet according to the next label Lc. Therefore, the MPLS packet is forwarded along LSPc, with the label stack being decreased by one level.

When the MPLS packet arrives at router RC, since the LSPc ends at RC, the RC pops the top label and forwards the MPLS packet according to the second label Ld. Therefore, the MPLS packet will be forwarded along LSPd at switching router RC, with the label stack remaining the last label.

During the MPLS packet is forwarded along LSPd, perhaps it passes some routers and these routers can replace the label. In this way, the MPLS packet arrives at its destination edge router E2 through LSPd. When E2 has received the MPLS packet, since LSPd ends at edge router E2, the label will be popped and the IP packet of traffic stream will be recovered.

The above-mentioned description takes that global label is used in forwarding traffic stream as example. In practice, based on the same principle of basic forwarding method with MPLS, the multi-level label stack method of MPLS technology can be employed in the condition that local label is used in forwarding traffic stream, and can be employed in the condition that the function of popping at the second last hop is configured also. The specific forwarding process will be omitted herein.

The invention can be used in the whole network of a telecommunication service provider, or be used in each area network respectively. For a service spanning the networks of multiple service providers, the invention can be used in each network separately.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for providing guaranteed Quality of Services (QoS) in an IP network, comprising:

configuring a service bearer logic network layer from a basic network layer for a service type for bearing traffic streams with guaranteed QoS requirements;

after receiving a service request with guaranteed QoS requirement from a subscriber, obtaining, by a service control layer, addresses of a source subscriber and a destination subscriber and QoS parameters of the service through analyzing the service request, and sending a route selection and resource application request to a bearer control layer;

allocating, by a bearer network resource manager in the bearer control layer, resources and route from the source subscriber to the destination subscriber which comprises multiple Label Switched Paths for the service in the service bearer logic network of this service type according to the addresses of the source subscriber and the destination subscriber, generating a multi-level label stack for the resources and route, and informing the multi-level label stack to the service bearer logic network; and forwarding traffic streams in the service bearer logic network according to labels configured in the multi-level label stack generated by the bearer network resource manager in the bearer control layer.

2. The method according to claim 1, wherein the service bearer logic network layer comprises edge nodes and tandem switching nodes, between any two nodes Label Switched Path (LSP) connections are established with Multi-Protocol Label Switching (MPLS) technology.

3. The method according to claim 2, wherein the tandem switching nodes are part of core routers selected from network resource management areas of the service bearer logic network layer.

4. The method according to claim 3, wherein different network resource management areas are respectively managed by correspondent bearer network resource manager.

5. The method according to claim 1, wherein levels of the multi-level label stack are decreased by one level each time an MPLS packet of the service passes a tandem switching node.

6. The method according to claim 5, wherein the just passed LSP ends after the MPLS packet of the service passes the tandem switching node, the label representing the LSP in the multi-level label stack is popped at the tandem switching node or at a second last hop router in the LSP, the tandem switching node forwards the MPLS packet according to the current top label representing a next LSP.

7. The method according to claim 1, further comprising: informing the service control layer to reject the service request from the subscriber if a bearer network resource manager finds the route selection is failed due to no enough resources in the logic topology of the area.

8. The method according to claim 1, wherein service bearer logic network layers for different service types have the same topology.

9. The method according to claim 1, wherein a network structure of the service bearer logic network layer is identical with the network structure of a public telephone network.

10. The method according to claim 1, wherein the service bearer logic network layer comprises any one of: a metropolitan area network, a provincial backbone network, a national backbone network and an international backbone network.

11. The method according to claim 1, wherein the basic network layer comprises any one of: an IP backbone network, a local area network, a metropolitan network and an internet network.

12. The method according to claim 1, wherein the service with guaranteed QoS requirement comprises any one of: a voice service, a video communication service, a stream media video service and other services with special QoS requirement.

13. The method according to claim 1, further comprising: after a subscriber terminates or finishes the service, releasing, by the bearer control layer, resources occupied by the service, and informing correspondent edge routers to cancel processing for the traffic stream of the service.

14. The method according to claim 1, wherein service bearer logic network layers for different service types have different topologies.

15. A system for providing guaranteed Quality of Service (QoS) in an IP network, comprising:
   a basic network layer, comprising edge routers and core routers, for bearing various IP service packets;
   a service bearer logic layer, planned and configured from the basic network layer and divided into multiple network resource management areas, comprising edge nodes, tandem switching nodes and connections between any two nodes, for bearing traffic streams with guaranteed QoS requirements;
   a bearer control layer, comprising bearer network resource managers, for managing the resources of a network resource management area for the service bearer logic layer; and
   a service control layer, comprising multiple service control layer servers, for processing service requests;
   wherein the bearer network resource manager allocates resources and route comprising multiple Label Switched Paths in the service bearer logic layer for a service, generates a multi-level label stack for the resources and route, wherein the multi-level label stack comprises multiple labels each of the label stands for an LSP of the route, and informs the multi-level label stack to the service bearer logic layer; and
   the service bearer logic network forwards the traffic streams of the service along the LSPs represented by the labels configured in the multi-level label stack.

16. The system according to claim 15, wherein the logic connections between nodes in the service bearer logic layer are Label Switching Path (LSP) connections established with Multi-Protocol Label Switching (MPLS) technology.

* * * * *